US012761623B2

(12) United States Patent
Diehm et al.

(10) Patent No.: US 12,761,623 B2
(45) Date of Patent: Oct. 13, 2026

(54) METHOD AND DEVICE FOR CONTROLLING THE SEQUENCE OF PROGRAM PARTS, PROGRAMMING METHOD, PROGRAMMING DEVICE

(71) Applicant: Schneider Electric Industries SAS, Rueil-Malmaison (FR)

(72) Inventors: Sebastian Diehm, Hasloch (DE); Marcus Würr, Erlenbach (DE)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 661 days.

(21) Appl. No.: 18/209,590

(22) Filed: Jun. 14, 2023

(65) Prior Publication Data

US 2023/0409001 A1 Dec. 21, 2023

(30) Foreign Application Priority Data

Jun. 15, 2022 (EP) .................................... 22305874

(51) Int. Cl.
*G05B 19/05* (2006.01)

(52) U.S. Cl.
CPC ......... *G05B 19/058* (2013.01); *G05B 19/054* (2013.01); *G05B 19/056* (2013.01);
(Continued)

(58) Field of Classification Search
CPC .. G05B 19/058; G05B 19/054; G05B 19/056; G05B 2219/15014; G05B 2219/15127;
(Continued)

(56) References Cited

U.S. PATENT DOCUMENTS 6,260,058 B1 7/2001 Hoenninger et al.
2010/0281485 A1* 11/2010 Ferch .................... G06F 9/4881 718/103

(Continued)

FOREIGN PATENT DOCUMENTS

CN 109542069 A 3/2019
CN 112948097 A 6/2021

(Continued)

OTHER PUBLICATIONS

Wikipedia Community: "Preemption (computing)", Wikipedia, Apr. 6, 2022, pp. 1-3, XP093003334, found on: <URL: https://web.archive.org/web/20220406164141/https://en.wikipedia.org/wiki/Preemption_(computing)>.

(Continued)

*Primary Examiner* — Christopher W Carter
(74) *Attorney, Agent, or Firm* — Quinn IP Law

(57) ABSTRACT

A method of controlling the sequence of program parts has the following steps: initiated by the occurrence of a first event (E1), executing a first program part (P1) on a first arithmetic logic unit (RW1), wherein the first event (E1) and/or the first program part (P1) is/are assigned a first priority (Py1), and initiated by the occurrence of a second event (E2), interrupting the execution of the first program part (P1) and then executing a second program part (P2) on the first arithmetic logic unit (RW1), wherein the second event (E2) and/or the second program part (P2) is/are assigned a second priority (Py2) that is higher than the first priority (Py1), wherein the first and/or the second program part (P1, P2) is/are a function block in the sense of IEC 61499 or a part thereof or a data transmission initiated thereby.

25 Claims, 8 Drawing Sheets

Figure 1:
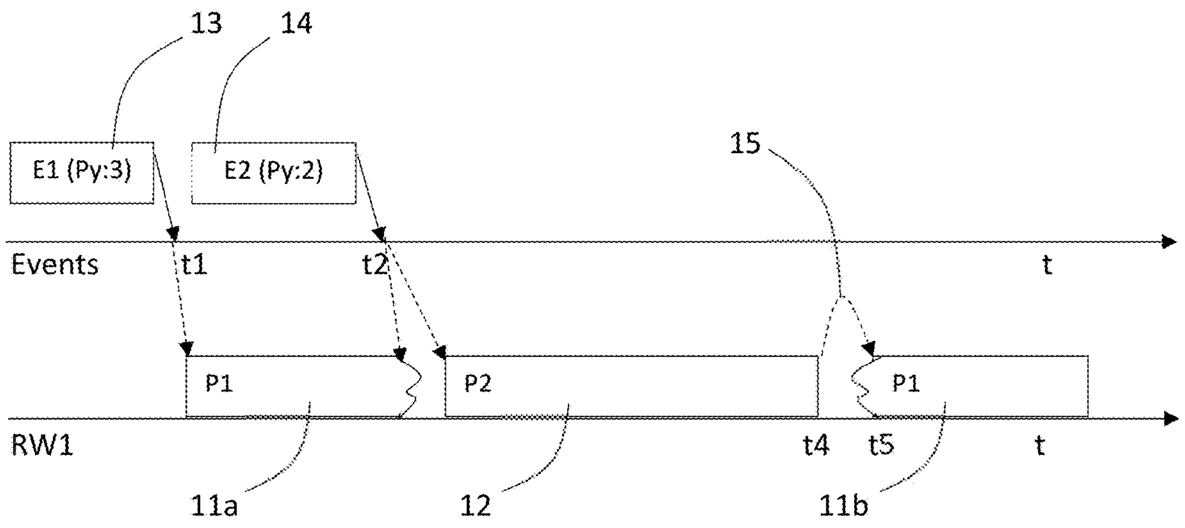

(52) U.S. Cl.
CPC .............. *G05B 2219/15014* (2013.01); *G05B 2219/15127* (2013.01)

(58) Field of Classification Search
CPC .. G05B 19/05; G06F 2209/484; G06F 9/4881
See application file for complete search history.

(56) References Cited

U.S. PATENT DOCUMENTS

| | | | | |
|---|---|---|---|---|
| 2015/0095690 | A1* | 4/2015 | Grosch | G06F 11/2097 714/4.11 |
| 2018/0299873 | A1* | 10/2018 | Chauvet | G05B 19/4185 |
| 2022/0187779 | A1 | 6/2022 | Wuerr et al. | |
| 2023/0359487 | A1* | 11/2023 | Nakano | G06F 9/4881 |

FOREIGN PATENT DOCUMENTS

| | | | |
|---|---|---|---|
| CN | 114625064 | A | 6/2022 |
| EP | 2541348 | A1 | 1/2013 |
| EP | 2728475 | A1 | 5/2014 |
| EP | 2778915 | A1 | 9/2014 |
| EP | 2899633 | A1 | 7/2015 |
| WO | 2018087314 | A1 | 5/2018 |

OTHER PUBLICATIONS

Christensen, James H. et al., "The IEC 61499 Function Block Standard: Overview of the Second Edition", presented at ISA Automation Week, 2012, 12 pages.
Smodic, Rene et al., "A Real-Time Execution Model for IEC 61499 Based Control Applications", INCOM'2006: 12th IFAC/IFIP/IFORS/IEEE/IMS Symposium, Information Control Problems in Manufacturing, May 17-19, 2006, Saint- Etienne, France, pp. 541-546.
Strasser, Thomas et al., "Design and Execution Issues in IEC 61499 Distributed Automation and Control Systems", IEEE Transactions on Systems, Man, and Cybernetics—Part C, Applications and Reviews, 2010, pp. 1-10.
Doukas, George S et al., "A Real-Time Linux Execution Environment for Function-Block Based Distributed Control Applications", 2005 3rd IEEE International Conference on Industrial Informatics (INDIN), Aug. 10-12, 2005, Perth Australia, pp. 1-7.
Dai, Wenbin et al., "Time-Stamped Event based Execution Semantics for Industrial Cyber-Physical Systems", 2015 13th IEEE International Conference on Industrial Informatics (INDIN), Jul. 22-24, 2015, 6 pages.
Sunder, Christoph et al., "Usability and Interoperability of IEC 61499 based distributed automation systems", 2006 4th EEE International Conference on Industrial Informatics (INDIN), Aug. 16-18, 2006, 7 pages.
European Search Report and Search Opinion dated Dec. 7, 2022 for corresponding European Patent Application No. 22305874.4, 11 pages.

* cited by examiner

Fig. 3a

31

| Priority 1 | |
|---|---|
| Event | calls up param. |
| E7 | P2, "A" |
| | |
| | |
| | |
| | |

32

| Priority 2 | |
|---|---|
| Event | calls up param. |
| E14 | P1, "D" |
| E10 | P4, "E" |
| E9 | P3 |
| | |
| | |

33

| Priority 3 | |
|---|---|
| Event | calls up param. |
| | |
| | |
| | |
| | |
| | |

34

| Priority 4 | |
|---|---|
| Event | calls up param. |
| ... | ... |
| E2 | P6, "F" |
| E3 | P4, "G" |
| E19 | P3 |
| ... | ... |

Fig. 3b

35

| Event | calls up param. | Priority |
|---|---|---|
| E2 | P6, "F" | 4 |
| E3 | P4, "G" | 4 |
| E14 | P1, "D" | 2 |
| E7 | P2, "A" | 1 |
| E10 | P4, "E" | 2 |
| E9 | P3 | 2 |
| E19 | P3 | 4 |
| ... | ... | ... |

Fig. 6 - Prior art
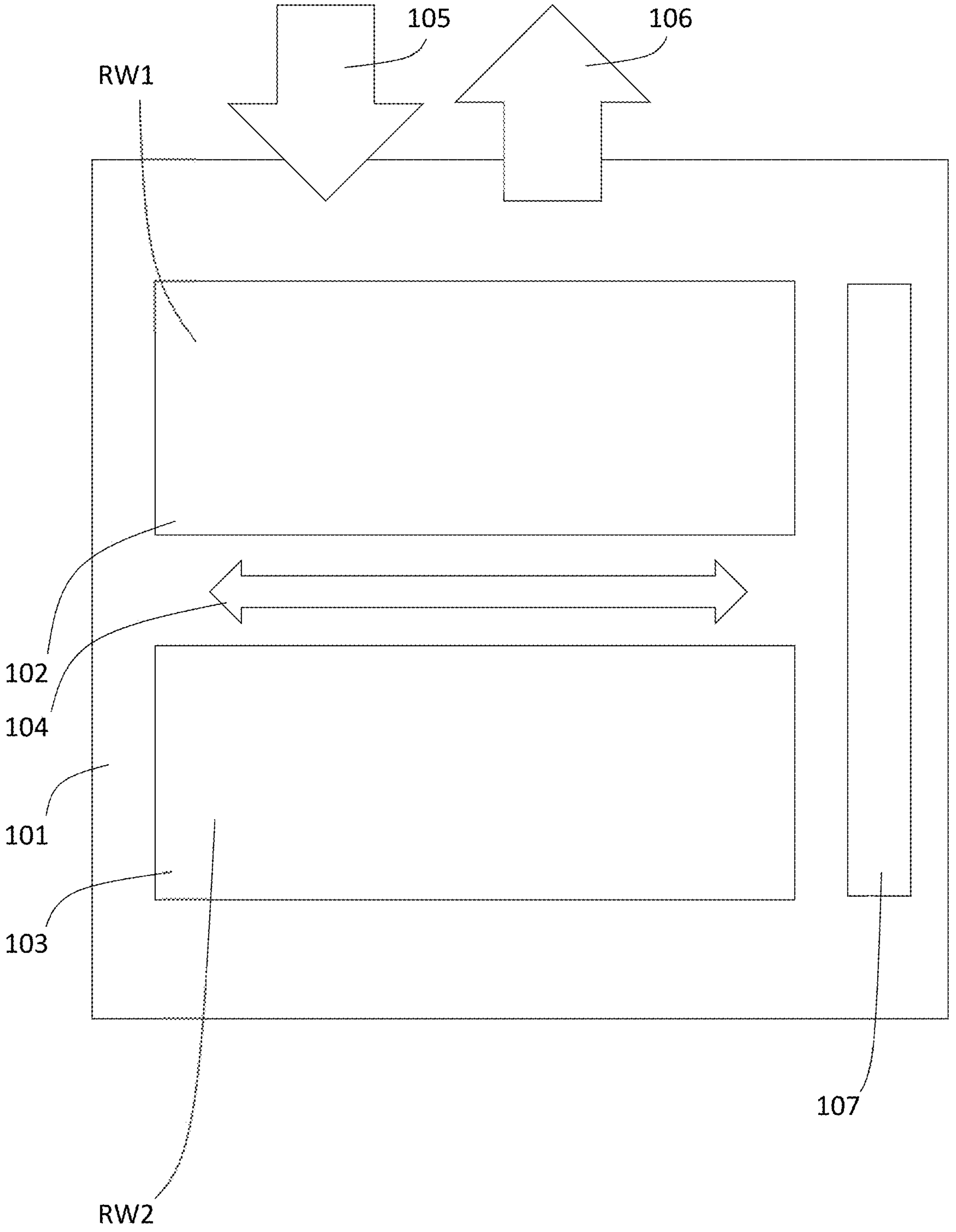

Fig. 7a - Prior art
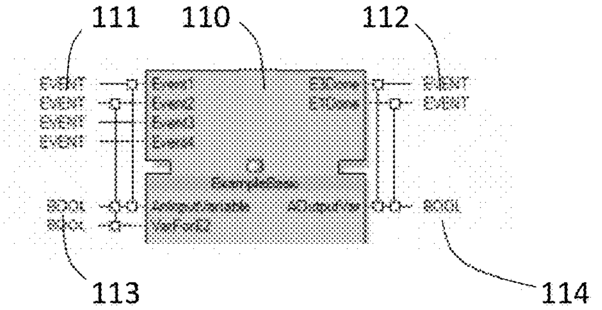
Fig. 7b - Prior art
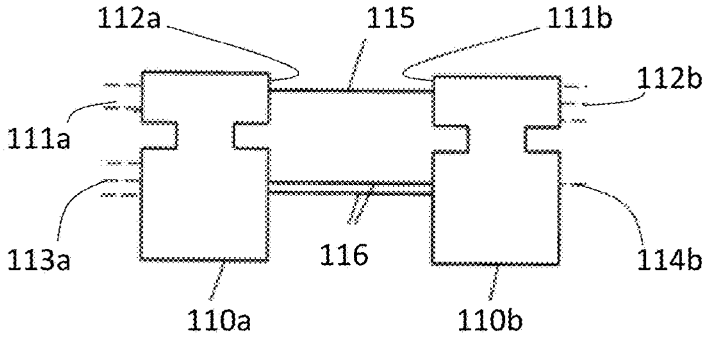
Fig. 8 - Prior art
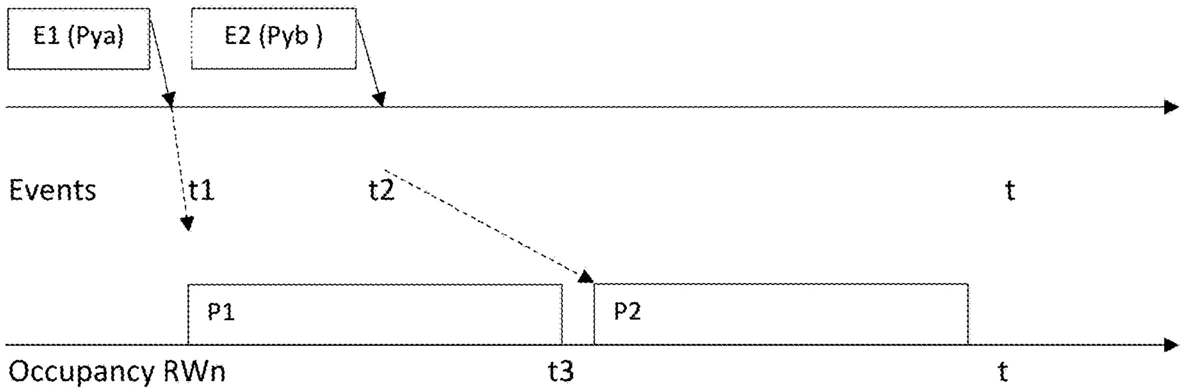

METHOD AND DEVICE FOR CONTROLLING THE SEQUENCE OF PROGRAM PARTS, PROGRAMMING METHOD, PROGRAMMING DEVICE

The invention relates to a method and an apparatus for controlling the sequence of program parts. It in particular relates to methods and apparatus for controlling the sequence of control programs, preferably on programmable logic controllers and in accordance with the IEC 61499 standard. The method or the apparatus can be in an industrial context, for instance as a control computer of a manufacturing plant or of a logistics facility or the like.

FIG. 6 schematically shows the design of such a control apparatus. 101 is the largest unit shown here. It can be a circuit board, for example. 102 and 103 can be separate hardware components here, for instance different processors on the same circuit board. They represent different arithmetic logic units RW that can operate in parallel independently of one another, on the one hand, but, on the other hand, can also require access to the same resources, for instance data or peripheral hardware components such as interfaces or the like. An operating control 107, only shown schematically, takes the necessary control steps to ensure the safe independent and mutually undisturbed operation of the individual arithmetic logic units RW.

In contrast to what has been described so far, the different arithmetic logic units can, however, also be virtual arithmetic logic units on a single piece of hardware. However, it should be noted in any case that the arithmetic logic units efficiently compete with one another to a certain extent. Virtual arithmetic logic units are allocated computing time of the real hardware that together cannot be more than 100% of the available time. And the arithmetic logic units can access common peripheral resources. In this respect, the representation in FIG. 6 is to be understood only by way of example. An essential aspect for the invention is that two or generally a plurality of arithmetic logic units limited in their resources are present in parallel. The question of how they are implemented, on the other hand, is of secondary importance for the time being.

The arithmetic logic units RW1 and RW2 can communicate with one another and to external. The communication among one another is only indicated very schematically by an arrow 104. Depending on how the arithmetic logic units are implemented, this communication can use different technologies, for instance communication on the operating system level, bus communication, network communication and the like. If arithmetic logic units communicate with one another, the communication will usually take place digitally. Incoming communication from external and outgoing communication to external are symbolized by the arrows 105 and 106. This can also be digital communication, for instance from other digital components. Or they can be analog signals, such as those coming from sensors or output to actuators. Accordingly, converters not shown, for instance A/D converters or vice versa D/A converters and possibly necessary drivers, can also be present.

The structure shown in FIG. 6 serves to execute a control program that is preferably created in compliance with IEC 61499. In IEC 61499, the programs are described as consisting of function blocks FB. FIG. 7*a* by way of example shows the representation of such a function block 110. Input events 111 triggering said function block 110 are symbolized at the top left. Output events 112 generated by the function block 110 are symbolized at the top right. It is essential here that a function block 110 is triggered for processing by an incoming event 111 and that it can itself generate as an output, in particular at the end of its activity, one outgoing event 112 or a plurality of such events in order to trigger one or more further function blocks 110 for execution or to make external initiations. At the bottom left, 113 symbolizes incoming data which the function block 110 receives for its activity as an input. At the bottom right, 114 symbolizes outgoing data which the function block 110 generates and makes available to other function blocks or to other digital components overall.

FIG. 7*b* shows the symbolic representation of the interaction of two function blocks 110*a* and 110*b*. It is assumed that the somehow triggered function block 110*a* triggers the function block 110*b* as a result of its activity. This is achieved by the function block 110*a* generating an event at its event output 112*a*, which event is fed to the event input 111*b* of the second function block 110*b*. This is symbolized by the link 115. In parallel hereto, it is possible, but not necessary in every case, for the function blocks 110*a* and 110*b* to exchange data such that the triggering function block 110*a* provides data to the triggered function block 110*b*. This is symbolized by links 116. However, the function block 110*b* can also obtain the input data it possibly requires from other sources and the function block 110*a* can send output data to other recipients.

In addition to what is shown, it is possible for a function block 110 to generate, at its event output 112, a plurality of events that can result in the quasi-simultaneous triggering of a plurality of different function blocks. Also, a function block 110 can receive a plurality of events from different sources at its event input 111 and can thus be triggered by different events.

A control program, such as can run on the hardware schematically shown in FIG. 6, consists of a combination of a plurality of or many function blocks, as are shown in FIGS. 7*a, b*. When a function block is triggered for execution, it is assigned by the operating control 107 to one of the arithmetic logic units for execution. The operating control 107 is a general control apparatus that performs the synchronizing and controlling measures for the individual arithmetic logic units in a superordinate manner. It works such that it, for example, monitors and controls the computing time allocations of logically established arithmetic logic units on a real CPU, such that it correctly associates incoming and outgoing data communication, such that it initiates the event-controlled and priority-controlled execution of function blocks on arithmetic logic units, and much more.

If a plurality of function blocks 110 are executed in parallel on a plurality of arithmetic logic units RW in one or possibly also in a plurality of simultaneously running control programs, access conflicts can occur in various constellations. FIG. 8 shows a very basic sequence for this purpose. The upper row shows the occurrence of different events along the time axis, while the lower graph shows the occupancy of a specific arithmetic logic unit RWn. It is assumed that, at a point in time t1, a first event E1 triggers a first program part P1, for instance a function block 110 as shown above. Said function block 110 is then executed on the arithmetic logic unit RWn symbolized below. The execution ends at the point in time t3. It is further assumed that at the point in time t2, which is before the point in time t3, a further event E2 occurs. If it is assumed that no further arithmetic logic unit than the arithmetic logic unit RWn shown is available, in this state it is not possible in programmable logic controllers to execute a program part P2, in particular a function block 110, which may have been triggered by the event E2. Rather, it is waited until after the point in time t3 for the arithmetic logic unit RWn to become free in order to then execute the program part P2 or function block 110 that corresponds to the second event E2.

Priorities can be assigned to events or to the program parts or function blocks 110 initiated by them. Priorities have relative importance among one another in that, in the competition already mentioned for resources, such as the computing time on a real CPU or allocations of real arithmetic logic units, higher priority events are preferably processed over lower priority events. When many events are to be expected in a short time, queues are formed. Events of different priorities are found in these queues according to certain structural criteria. The priority can then have the result that the highest priority event in the queue is immediately used for execution, while lower priority events have to wait.

However, even in the case of FIG. 8, a high priority event, if it occurs at the point in time t2 as shown in FIG. 8, has to wait at least until the point in time t3 to be able to be executed. This is disadvantageous if, for example, low priority events with long execution times take up available arithmetic logic units for a long time and thus prevent a high priority event from being executed.

It is the object of the invention to disclose a method and an apparatus for controlling the sequence of program parts that enable an improved priority-based control of the sequence of program parts.

This object is satisfied by the features of the independent claims.

A method of controlling the sequence of program parts has the steps: initiated by the occurrence of a first event, executing a first program part on a first arithmetic logic unit, wherein the first event and/or the first program part is/are assigned a first priority, and initiated by the occurrence of a second event, interrupting the execution of the first program part on the first arithmetic logic unit and then executing a second program part on the first arithmetic logic unit, wherein the second event and/or the second program part is/are assigned a second priority, wherein the second priority has a predetermined and in particular a user-defined relationship with the first priority, wherein the second priority can be higher than the first priority, wherein the first and/or the second program part is/are a function block in the sense of IEC 61499 or a part thereof or a data transmission initiated thereby, and/or wherein the first program part is a program that runs on the first arithmetic logic unit when the second event occurs.

With the presented method, it is possible in a priority-controlled manner to interrupt a running program part to be able to execute another program part. The devices are in particular such that a higher priority program part can interrupt a lower priority program part. In this way, it is avoided that a high priority program part or a high priority event is prevented from being executed or is severely slowed down for a long time by low priority program parts that were triggered beforehand. These interruptions are also performed, implemented and managed by the operating control 107. The same applies to a later continuation of the previously interrupted program part.

Where reference is made in this description to designs in accordance with IEC 61499 and compliance is, for example, demonstrated, this is to be understood as extending as far as is necessary for the function of the invention or as far as is not modified by the described features of the invention.

As already shown, the program parts can be parts of a device control program or plant control program. Said control program can communicate with many external components, including analog and digital components. In very general terms, the sequence control is at least partly event-controlled and priority-controlled. This means that program parts or function blocks are called up in an event-controlled manner and prioritized among one another. If computing power or arithmetic logic units are available, the program parts can be executed immediately. Otherwise, they or the events that trigger them are placed in one or more event lists, also called queues, that are processed in accordance with certain criteria.

An important feature of the invention is that the events and/or program parts are assigned priorities. The priorities can in this respect indicate execution urgencies of the respective program part or of the event triggering a program part. As an example, it is sometimes assumed in this description that four priorities exist. They are numbered 1, 2, 3 and 4. For example, each event can be associated with one of these priorities. In this respect, it is assumed that priority 1 is the highest priority, i.e. it indicates the highest execution urgency, and then the priorities 2, 3 and 4 each indicate lower execution urgencies in descending order. Events or program parts within a considered control program can have been assigned priorities during the programming. Events arriving from external can be assigned priorities in accordance with the interface used or similar.

The assigned priorities lead to unambiguous results in the operating control if events or program parts of different priorities compete with one another in the sense that the higher prioritized event or program part is executed before the lower prioritized one. If events or program parts with the same priorities compete, further strategies can solve the conflict, for instance "Round Robin", FIFO ("First In, First Out"), LIFO ("Last In, First Out") or similar.

The system therefore keeps queues for events or program parts that cannot be executed immediately. In this respect, for a plurality of priorities, respective separate event lists can be kept in the sense of queues that each store events of the respective associated priority that have occurred and that designate program parts still to be processed. The above-mentioned second event is then entered in the event list corresponding to its priority and then, if there is no entry in any event list for a higher priority, is possibly used for the interruption of the execution of the first program part on the first arithmetic logic unit in accordance with the processing rules for the entries in the event list of its own priority, for instance round robin, FIFO, LIFO.

For running program parts, their priorities or the priorities of the events calling them up are suitably stored that they can be included in the priority-based comparison. Thus, the event lists can be processed away from the top, i.e. from the highest priority, and in relation to the priorities of any running program parts. These priorities can e.g. be tabulated together, which would then be updated and continued in each case and would then, if required, be retrieved, or an acquisition routine for these priorities can be provided that acquires the various priorities from distributed sources, e.g. the definitions of the running tasks, when they are needed.

A plurality of tasks can be used for the method that were created in advance as respective execution environments. The creation of a task as an execution environment can comprise a configuration of the priority with which the task is to be executed in a matching relation to the priorities of the events or function blocks and the priorities of the event queues, and can furthermore comprise a link or association with the event list of the corresponding priority. An execution environment is thus defined by a parameter set that is defined in advance, that is stored, and that can be called up at the time of execution. The parameter set forms settings of the arithmetic logic unit that are used during the execution of a program part.

They are then defined and organized in advance and thus do not require a higher-ranking administrative activity at the time of execution so that they are quickly available. The association and the control in this respect is performed by the operating control 107. The arithmetic logic units are also predefined or defined and organized in advance and thus do not require a higher-ranking administrative activity at the time of execution so that they are quickly available.

If, for example, four priorities are defined, one or more tasks can be created for each of these priorities and associated with them for execution. The association and the control in this respect are performed by the operating control 107.

However, tasks can also be used that are created in real time as a respective execution environment, preferably in response to an event that occurs, and that are removed in real time, preferably at the end of the processing of a program part, wherein the arithmetic logic units are activated in accordance with the priorities of the events that trigger them.

This variant is advantageous if rather few, longer lasting program parts are pending for execution. There will then be no administration effort for the management of arithmetic logic units that are not required. However, it becomes disadvantageous when there many events pending for execution, because even if many tasks are created, this does not increase the actually available resources so that possibly futile administrative efforts are made to create tasks.

The second event that leads to the interruption of the first program part on the first arithmetic logic unit is usually generated by another program part running on another arithmetic logic unit. However, it is also conceivable that a program part generates an event that interrupts the generating program part itself.

To decide whether the interruption of a running program part is necessary or not, monitoring results can be generated or obtained. They can be monitoring results with respect to the activity of the individual arithmetic logic units. These monitoring results can be generated by the described methods themselves, e.g. by the operating control 107, or they can be obtained from other system components, for instance the operating system, e.g. by the operating control 107. If it is evident from the monitoring results that arithmetic logic units are running empty or can be used in view of the available computing time, the interruption of a program part for the execution of a higher priority program part is not necessary. Instead, the higher priority program part can then e.g. be assigned to an empty running task or a new task can be created for this purpose.

Via the assignment of the execution of program parts, in particular the second program part, to one of the monitored arithmetic logic units, a decision can also be made in accordance with properties of the monitored arithmetic logic units. This takes into account the fact that not all the arithmetic logic units have to be the same, but can differ, for example, in terms of computing power, data connection and the like. Also with regard to such criteria, assignments of program parts to be executed to arithmetic logic units can take place and can then possibly lead to the interruptions described.

A program part can itself consist of distinguishable subparts. The possibly necessary interruption of the execution of the first program part can take place after the processing of such a subpart included in the first program part and before the start of the processing of a further such subpart in the first program part. If necessary, the interruption can, however, also occur at any desired point of the program part or of a subpart thereof.

Program parts can also be called up and processed in accordance with an execution control planning in accordance with IEC 61499, the so-called "execution control chart", wherein the calling up of a program part from the execution control planning can be the first event effecting the execution of the first program part and/or the second event effecting the execution of the second program part, to which event a priority can be assigned or is already assigned. The priority-controlled processing of these events can overwrite or modify the otherwise following determinations of the execution control planning. In this way, an operational link to the known approach under IEC 61499 of using the "execution control chart"—"ECC"—can be established. The procedure of IEC 61499 is thus partly used and partly overwritten.

The interruption of the execution of the first program part can comprise the backup storage of the currently relevant device state, in particular the storage of the values of an arithmetic logic unit, registers, data memories, a program memory, a program pointer, files. The continuation of the previously interrupted program part can then comprise the loading of the device state that was backup-stored during the interruption for the arithmetic logic unit taking over the continuation. In this way, it is brought about that an interrupted program part can continue the processing at the logical point, where the processing was completed beforehand.

It is possible to designate program parts as uninterruptible or as program parts that cannot be executed multiple times in parallel so that, also on request by a higher priority event, they cannot be interrupted or cannot be executed a further time in parallel by a called-up task of a higher priority. This can, for example, be useful if it is a program part whose states cannot be buffered since, for example, they are external or voluminous or similar. Even if an interruption or a parallel execution of a program part would then therefore be performed in accordance with the method described so far, it is omitted if a check has shown that the program part intended for interruption is marked as uninterruptible or as not executable multiple times in parallel.

A subject of the invention is also an apparatus in accordance with IEC 61499 for performing the method described that can be a device control or a plant control and/or a programmable logic controller and that can have at least one sensor or data input and at least one actuator or data output.

A subject of the invention is also an execution apparatus for IEC 61499-compliant programs. It comprises at least two arithmetic logic units for the parallel execution of program parts that are triggered by events marked with priorities. An execution control controls the execution of program parts on the arithmetic logic units based on the priorities that are associated with the events triggering the program parts. The execution control is adapted to interrupt the execution of a first program part on an arithmetic logic unit under certain circumstances and to initiate the execution of a second program part on this arithmetic logic unit if the event triggering the execution of the second program part has a higher priority than the event triggering the execution of the first program part.

Once again, it is pointed out here that a reference to IEC 61499 does not mean that it has been fully implemented. Rather, it can be modified in accordance with the information in this description.

A subject of the invention is also a programming method in which an IEC 61499-compliant programming interface is provided that is adapted or suitable for programming the method described above. In particular, it is suitable for entering the possibly necessary interruptions, for entering the data backups possibly required for this purpose and data backups, possibly for entering the marking of a program part as uninterruptible or as not executable multiple times, and similar. The programming interface can in this respect be or comprise a graphical user interface that is adapted for entering the steps mentioned. In this respect, a programming apparatus that implements the programming method just described is then also a subject of the invention.

Figure 2:
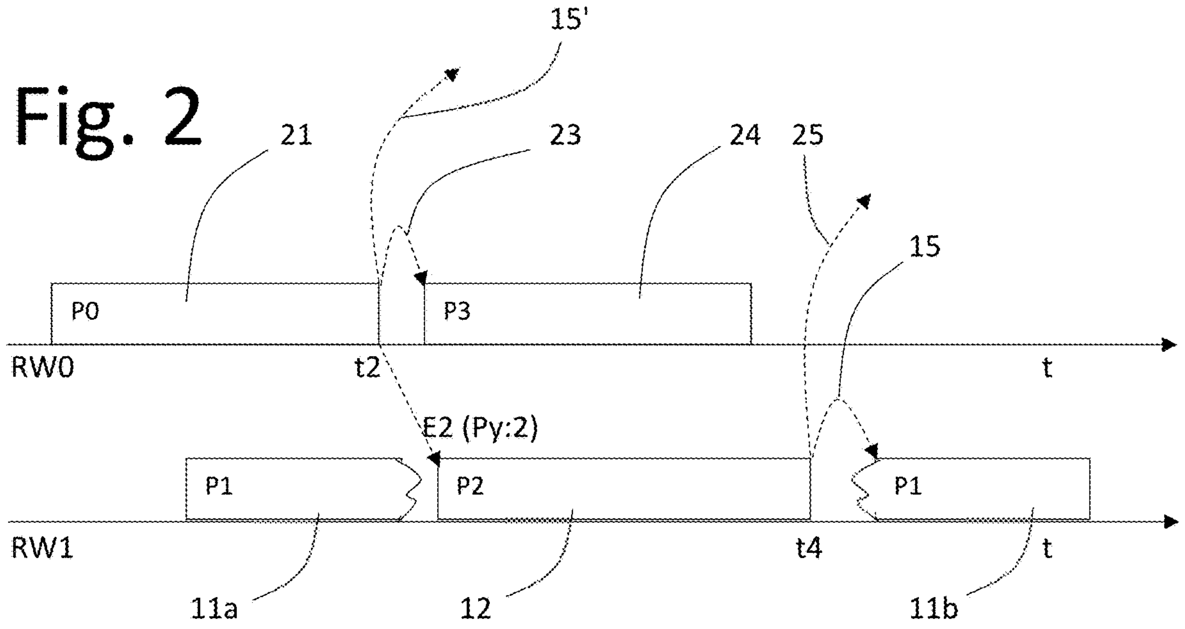
Figure 4A:
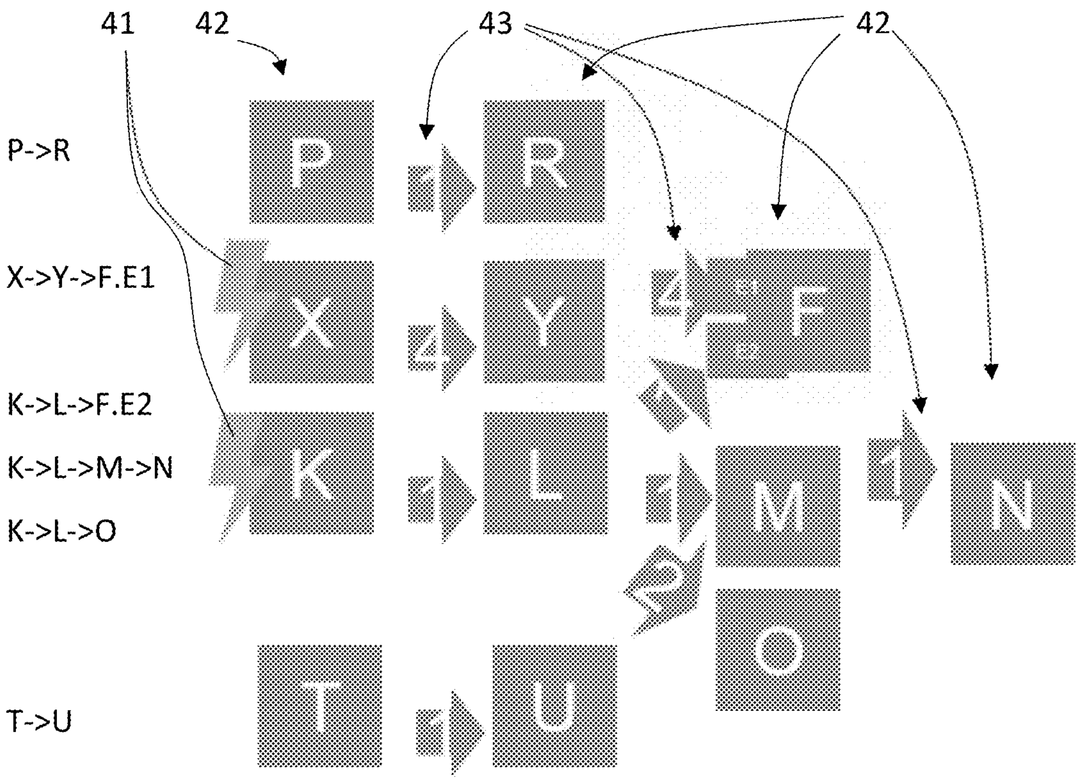
Figure 5A:
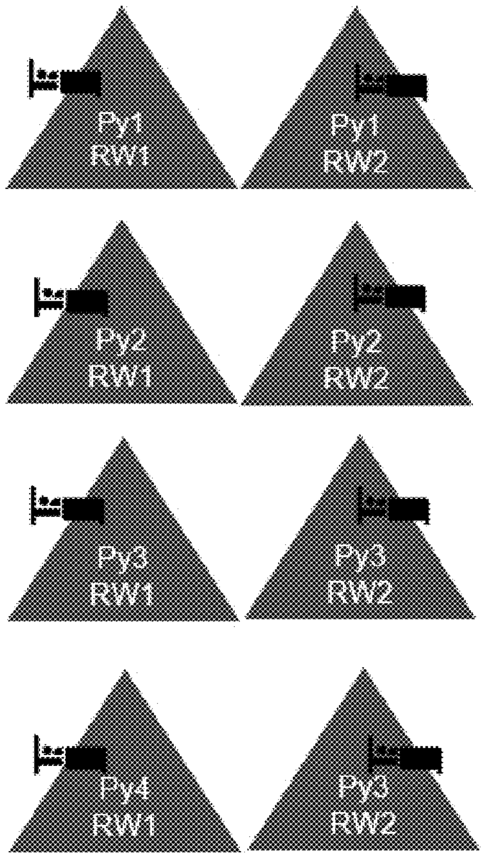
Figure 5B:
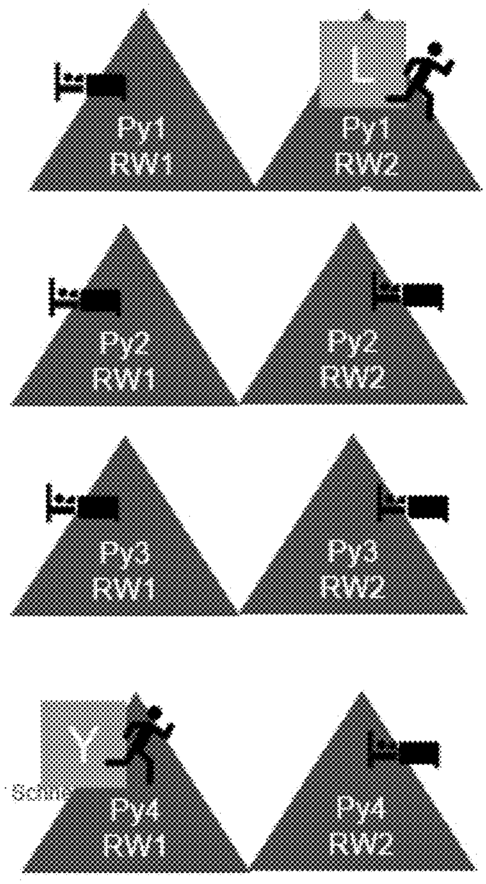
Figure 5C:
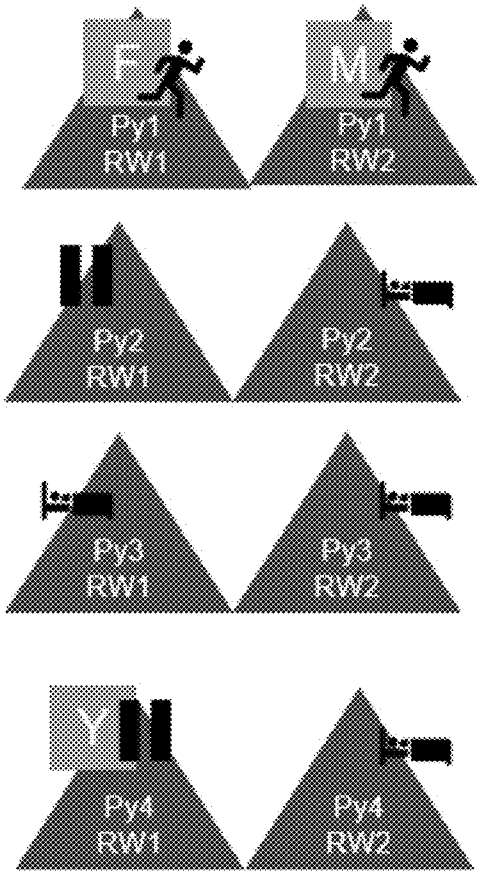

Embodiments of the invention will be described in the following with reference to the drawings; there are shown FIG. 1 generally, the interruption of a program part;

FIG. 2 competing access to an arithmetic logic unit;

FIG. 3 a plurality of event lists;

FIGS. 4*a, b* an example of a control program;

FIGS. 5*a* to *c* an example of a sequence in accordance with the invention;

FIG. 6 a known execution structure;

FIGS. 7*a, b* function blocks in the sense of IEC 61499; and

FIG. 8 a known method.

In FIG. 1, the upper row shows events occurring along the time axis. E1 is an event 13 that is assigned a priority Py "3". In general, the priorities can be assigned to the events during the programming of the control program or of the individual program parts. It is assumed that the event E1 13 leads to the execution of a first program part P1 11*a*. It is further assumed that a second event E2 14 occurs at the point in time t2 at which the processing of the first program part P1 has not yet been completed. The second event E2 14 has the priority Py 2 and is thus prioritized higher than the first event E1 13 with the priority 3 or the corresponding first program part P1.

Assuming that for systemic reasons it is not possible to assign the second program part P2 associated with the second event E2 to an arithmetic logic unit other than the arithmetic logic unit RW1 shown, the second event E2 14 causes the first program part P1 11*a* to be interrupted shortly after the point in time t2 so that the second program part P2 12, which is triggered by the second event E2 14, is executed on the first arithmetic logic unit RW1.

It is further assumed that the processing of the second program part P2 12 is completed at a later point in time t4. This is the reason to then continue the processing of the interrupted first program part 11*a* at a point in time t5, which is indicated by reference number 11*b*.

It has already been pointed out that program parts can be marked as uninterruptible. If this were the case for the program part P1 11 in the example of FIG. 1, the occurrence of the second event E2 14 at the point in time t2 would, unlike as shown in FIG. 1, not lead to the interruption of the first program part 11. Rather, the first program part 11 would be continued and the second program part P2 corresponding to the higher priority second event E2 14 would have to be assigned to another arithmetic logic unit for execution or, if necessary, would conventionally have to wait.

FIG. 2 shows in more detail one possibility of how an access conflict to arithmetic logic units can arise. Unlike in FIG. 1, events are not shown at the top and an arithmetic logic unit assignment is not shown at the bottom, but the occupancies of two arithmetic logic units with program parts are rather shown above one another. It is assumed that a program part P0 21 initially runs on an arithmetic logic unit RW0 and that, as shown, a first program part P1 11*a* with a priority Py=3 runs on an arithmetic logic unit RW1 starting later or possibly also earlier. For the program part P0 21, it is assumed that it generates two events at the end of its execution at the point in time t2, namely the second event E2 of the priority Py=2 already described in FIG. 1 and a further event 23 of, for example, the same priority Py=2.

The program part 24 triggered by the event 23 can then be executed on the arithmetic logic unit RW0 which has become free due to the completion of the program part P0, while the program part P2 then cannot be executed there. Accordingly, it is assigned to another arithmetic logic unit, the arithmetic logic unit RW1, for which it is assumed that the processing of the first program part P1 11*a* is still running at the point in time t2. The processing of the first program part P1 11*a* is then interrupted on this arithmetic logic unit RW1 since the program part P2 12 was called up with a higher priority and the already shown processing of the second program part P2 12 then takes place there that is assumed to be completed at the point in time t4.

At this point in time t4, the second program part P2 12 can itself generate one or more events that correspond to its regular programming and that are indicated in FIG. 2 by reference number 25. In addition, the operating control 107 can, for example, add an event 15 that can e.g. be entered in the event lists and can trigger the resumption of the processing of the first program part P1 11*b*. The resumption can thus be included in the priority-controlled event processing. However, it is also possible to initiate the resumption of the processing of the first program part P1 11*b* directly after the completion of the processing of the interrupting program part P2 12 by the operating control. For this purpose, the operating control can keep a suitable list of interrupted program parts waiting for the resumption.

A further event 15' can also be defined or generated, for instance by the operating control 107, namely an event for triggering the processing of the interrupted program part, immediately on a program part interruption shown in FIGS. 1 and 2, i.e. generally in response to a program part interruption to be performed due to an event (in the example E2 (Py:2)). This event 15' can also be provided with a priority. For example, it can be given the priority of the interrupted program part or it can be ranked higher to preferably end the interrupted program part. This further event can then be entered in the otherwise kept event list 35 or event lists 31-34 and can be processed together with the other events in a priority-controlled manner.

FIG. 3*a* shows a possibility of setting up event lists, sometimes also called "queues". An embodiment is shown in which it is again assumed that events are provided with one of four priorities and a separate event list 31, 32, 33, 34 is kept for each of these priorities 1, 2, 3, and 4. The lists themselves then do not need to list the priorities of the events since they have already been predefined by the respective list itself. In any case, the list, however, specifies in tabular form the events of the associated priority that still have to be processed. In addition, it can, for example, list the program part for the respective event that is called up by the listed event and, if necessary, can also hold parameters that are transferred when the program is called up.

To avoid misunderstandings, it is pointed out that event lists change dynamically by adding new events, in particular the most recently generated events, and deleting previously entered events, in particular processed events, due to operational reasons. Specific representations are then snapshots in each case.

As already mentioned, the program parts triggered by events can be function blocks in the sense of IEC 61499. Accordingly, in the embodiment of FIG. 3*a*, the information shown in the respective right columns would be identifications of respective function blocks of IEC 61499. It is assumed for the list 31 of the priority 1 that it only holds one event E7 that triggers a program part P2 having a parameter set that is only symbolized by "A". The event list 32 for priority 2 accordingly includes three events. For event E9, it is assumed that it triggers program part P3 for whose triggering no parameters have to be transferred. The event list 33 for priority 3 is assumed to be empty since no events of priority 3 are currently pending for processing. The event list 34 for priority 4 is again assumed to be occupied with some events.

In the sequence control procedure described, the system control can now process the pending events starting with the first event list 31. In the example of FIG. 3*a*, the event E7 of the event list 31 for priority 1 would therefore first be used for execution. The event E7 would, if possible, be assigned to a free arithmetic logic unit for processing. If this is not possible, the interruption of a lower priority process on an occupied arithmetic logic unit would be initiated as described. If the event list 31 for priority 1 is empty, the processing of the events of the event list 32 for priority 2 can be started. Unlike in the event list 31 for priority 1, there are a plurality of events in the event list 32. It must then be decided according to which criterion these events are processed. Strategies such as FIFO, LIFO, or Round Robin can be used here. If the event lists 31, 32 and 33 are empty at any point in time in the processing sequence, the processing of the events in the event list 34 can be started.

FIG. 3*b* shows another way of creating the event list. A single event list is created here across all the priorities. Accordingly, the priority of the respective event must also be listed in this list, because otherwise the information would then be lost. During the processing, the highest priority event is then to be selected from the list in each case and processed as described.

The event list design in accordance with FIG. 3*b* can thus correlate with the fact that arithmetic logic units are not defined and installed in advance, but are installed at the time of execution.

So far, the event-controlled and priority-controlled execution and, if necessary, interruption of program parts has been described. In the same way, this can apply to the event-controlled and priority-controlled execution and, if necessary, interruption of data transmissions that can in this respect also be understood as program parts.

In this description, an execution environment can be an arithmetic logic unit configured in a certain way by parameters. A task can be a program part running or executable in an execution environment. An arithmetic logic unit can be a processor with associated hardware or, generally, an allocated physical resource, for instance a computing time portion of multi-tasking-capable hardware. They can also be virtual computing resources or logically organized computing resources on a single piece of hardware that each execute a task per se at a point in time. A program part can be a function block in the sense of IEC 61499. An arithmetic logic unit can be a core in the sense of IEC 61499.

FIG. 4*a* shows by way of example a control program and its program parts and events defined by the programming. The squares 42 define program parts P, X, K, T, R, Y, L, U, F, M, O and N. They can be function blocks in accordance with IEC 61499. The arrows 43 symbolize events with which program parts 42 trigger one another. Said events are assigned priorities Py here that are entered in the respective arrow, i.e. below one another 1, 4, 1, 1 in the left arrow column, below one another 4, 1, 1, 2 and at the right 1 in the middle arrow column. At the left, FIG. 4*a* shows the sequences that are in each case generated by the defined events.

With 41, input events are defined that trigger the control program and that are not initiated by the program itself. As a rule, they are external events, for example the arrival of sensor data that lead to certain processing processes and possibly resulting device controls. In FIG. 5*a*, it is again assumed that the priority 1 has the highest urgency and, in contrast, the priorities 2, 3 and 4 have decreasing urgencies.

In FIG. 4*a*, it should be noted that a control program considered here can only be partly triggered and executed. In FIG. 4*a*, it is, for example, assumed that the upper row of the function blocks P and R and the lower row of the function blocks T and U are not triggered and are therefore not executed. In accordance with FIG. 4*a*, triggering events only take place for the function blocks X and K, which is assumed here to be more or less simultaneous for purposes of explanation.

Figure 4B:
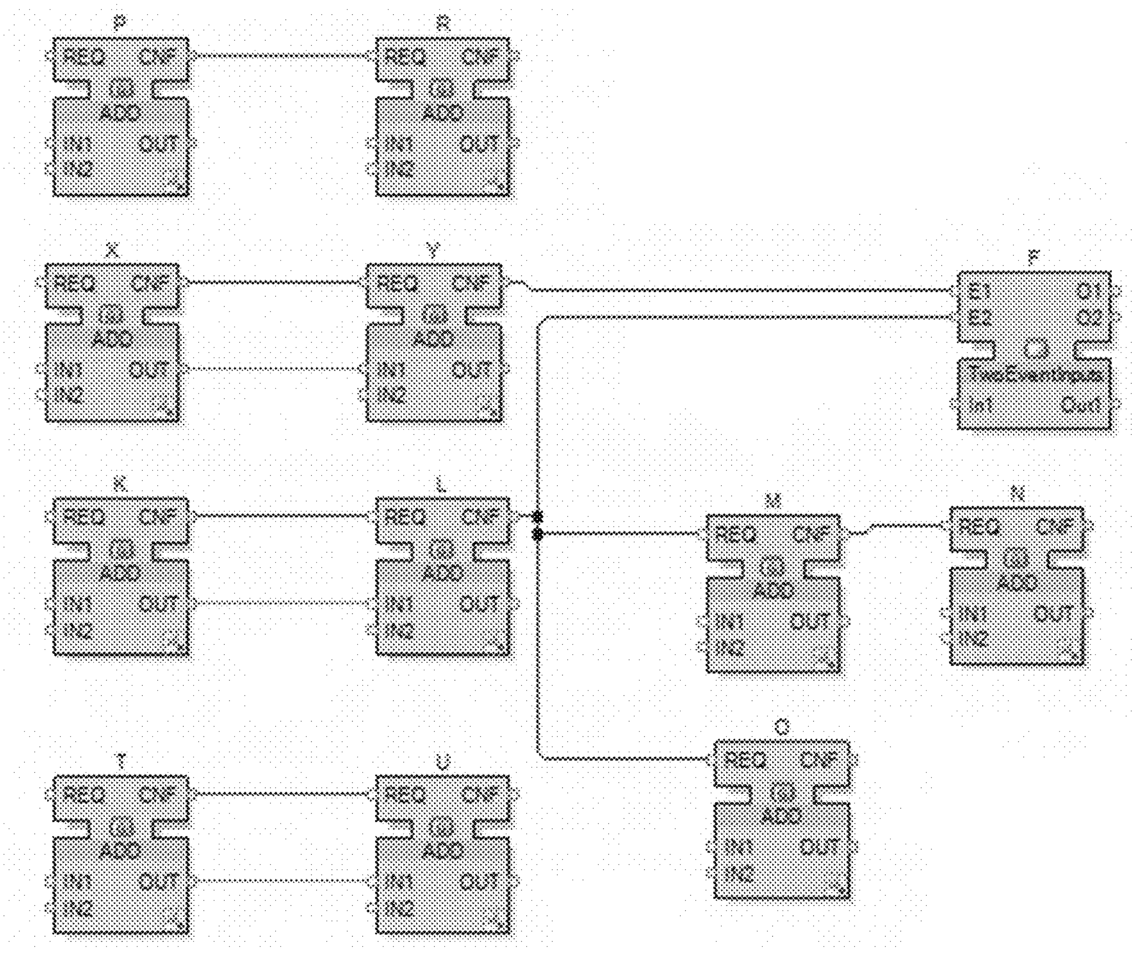

FIG. 4*b* shows the representation corresponding to FIG. 4*a* of the control program comprising function blocks in the sense of IEC 61499. In the upper part, the event links are shown, but without priorities, that trigger the execution of the individual program parts or function blocks.

FIGS. 5*a* to 5*c* show the dynamic sequence of the processing of the program from FIGS. 4*a* and 4*b*. It is assumed that there are two arithmetic logic units and that four different priorities are used. As already mentioned, the program parts P, R, T and U are not executed here due to the lack of an external trigger. They are therefore not shown.

FIG. 5*a* shows the status of the control apparatus before the initial events 41 arrive. The triangles symbolize potentially running tasks, wherein a maximum of two can be simultaneously executed due to the available two arithmetic logic units RW1 and RW2. They are all in an idle mode or a state of rest. It is assumed here that the tasks are predefined and that two tasks are in each case created per priority.

FIG. 5*a* symbolically shows the system state before the arrival of the external events 41 in FIG. 4*a*. The entire system is at rest; all the arithmetic logic units are running empty. All the queues are also empty at this moment. After the arrival of the external events 41, as shown in FIG. 4*a*, the system starts processing the program parts X and K and, at their respective ends, they generate events of the priorities 4 and 1 to trigger the program parts Y and L. Accordingly, at the end of the processing of the program parts X and K, the fourth event list 34 and the first event list 31 have corresponding entries, while the other event lists are empty. However, it is assumed that Y is a long-running program part triggered with a low priority. It is still running when program part L has already been processed.

As already mentioned, the incoming external events 41 can also be assigned priorities by appropriate steps or can be assumed as default. This can take place in the operating control 107.

FIG. 5*b* shows the state in which the system is working on the processing of the program parts L and Y. At the moment when the processing of the program parts L and Y is started, the respective events are taken out of the respective event lists so that these lists are then empty again. Program part L generates three events, each for triggering the program parts F, M and O, on its completion. The first two have priority 1, the last priority 2. Therefore, there are then two entries in the first event list 31, and one entry in the second event list 32, and the remaining event lists are empty.

FIG. 5*b* shows the state after the completion of the processing of the program parts X and K, in which state the program part L is executed in the meantime with the task Py 1 RW2 and the program part Y is processed with the task Py 4 RW1. Accordingly, all the queues are empty after the start of the processing of the program part L. When the processing of the program part L is completed, three events are, however, generated, of which two—to trigger the program parts F and M—are entered in the first event list 31 and one is entered in the second event list 32. Two events of the highest priority, and a further event of the next lower priority 2, are then present and a program part Y of the lowest priority 4 is still being executed.

FIG. 5*c* shows that the two high priority events for program parts F and M lead to their execution by processing the program parts F and M on the two arithmetic logic units RW1 and RW2. To achieve this, the program part O, which was called with the second-highest priority, or just this event of the priority 2, still remains in the queue and waits, which is graphically indicated at Py2RW1. The still running program part Y is interrupted at Py4 RW1 to enable the processing of the two high priority program parts F and M. This is schematically shown in FIG. 5*c*. When one of the high priority program parts F and M has been processed in the working state of FIG. 5*c*, the second-priority program part O can be executed next. And if an arithmetic logic unit subsequently becomes free, program part Y can be completed afterwards.

In this way, it is ensured that high priority program parts can be reliably executed and are not accidentally blocked by possibly long-lasting low priority processes.

REFERENCE NUMERAL LIST

11, 12, 21, 24, 52 program parts
13, 14, 15, 23, 25, 53 events
31 to 35 event lists
51 external event
101 circuit board
102 CPU, core
103 CPU, core
104 communication structure
105 communication input
106 communication output
107 operating control
110 function block
111 incoming event
112 outgoing event
113 input data
114 output data
115 event link
116 data link

The invention claimed is:

1. A controller-implemented method of controlling a sequence of program parts, comprising initiated by the occurrence of a first event, executing a first program part on a first arithmetic logic unit, wherein at least one of the first event or the first program part is assigned a first priority, initiated by the occurrence of a second event, interrupting the execution of the first program part on the first arithmetic logic unit and then executing a second program part on the first arithmetic logic unit, wherein at least one of the second event or the second program part is assigned a second priority, wherein the second priority has a predetermined, user-defined relationship with the first priority, wherein the second priority is higher than the first priority, wherein the first or the second program part is at least one of a function block based, at least in part, on IEC 61499, a part of the function block, or a data transmission initiated by the function block;

storing, in an electronic data storage, event lists, each event list corresponding to a different one of the first and second priorities, wherein each event list includes:

events that have occurred in accordance with the associated priority; and program parts still to be processed in accordance with the associated priority;

wherein the controller is configured to implement the events still to be processed of the event list of the second priority before the events still to be processed of the event list of the first priority.

2. The method in accordance with claim 1, wherein one or more of the program parts are parts of device control programs or plant control programs that run on a programmable logic controller.

3. The method in accordance with claim 1, in which at least one event list is kept that stores events that have occurred in accordance with the associated priority and that designates program parts still to be processed, wherein storing the event lists includes, for a plurality of priorities, storing respective separate event lists that in each case store events of the associated priority that have occurred and that designate program parts still to be processed, wherein the second event is entered in the event list corresponding to its priority and then, if there is no entry in any event list for a higher priority, is used for interruption of the execution of the first program part on the first arithmetic logic unit in accordance with the processing rules for the entries in the event list of its own priority.

4. The method in accordance with claim 1, wherein a plurality of tasks are used that were created in advance as respective execution environments.

5. The method in accordance with claim 4, wherein a plurality of tasks are used that were created in advance as respective execution environments such that one or more tasks are created for each priority value.

6. The method in accordance with claim 1, wherein tasks are used that are created in real time as respective execution environments and that are removed in real time.

7. The method in accordance with claim 6, wherein tasks are used that are created in real time as respective execution environments in response to an occurring event.

8. The method in accordance with claim 6, wherein tasks are removed in real time at the end of the processing of a program part.

9. The method in accordance with claim 1, wherein the second event is generated by the second program part running on a second arithmetic logic unit.

10. The method in accordance with claim 1, comprising;

obtaining monitoring results of the occupancy or utilization of the first arithmetic logic unit, and in accordance with the monitoring results, when the second event occurs, initiating the interruption and the execution of the second program part on the first arithmetic logic unit.

11. The method in accordance with claim 10, wherein monitoring results relating to the occupancy or utilization of the first arithmetic logic unit and one or more further arithmetic logic units are obtained and, in accordance with the monitoring result, when the second event occurs, the initiation of the interruption and the execution of the second program part on the first arithmetic logic unit is caused.

12. The method in accordance with claim 11, wherein a decision on the assignment of the execution of the second program part to one of the monitored arithmetic logic units is made in accordance with the monitoring result.

13. The method in accordance with claim 11, wherein a decision on the assignment of the execution of the second program part to one of the monitored arithmetic logic units is also made in accordance with properties of the monitored arithmetic logic units.

14. The method in accordance with claim 10, comprising:

obtaining monitoring results of the occupancy and/or utilization of the first arithmetic logic unit from an operating system function.

15. The method in accordance with claim 1, wherein the first program part includes a first subpart and a second subpart and the interruption of the execution of the first program part takes place after processing the first subpart and before or after starting the processing of the seconds subpart.

16. The method in accordance with claim 1, wherein program parts are called up and processed in accordance with an execution control planning in accordance with IEC 61499, wherein the calling up of a program part from the execution control planning can be the first event effecting the execution of the first program part and/or the second event effecting the execution of the second program part, to which event a priority can be assigned or is already assigned, and these events can overwrite or modify the determinations of the execution control planning.

17. The method in accordance with claim 1, wherein the interruption of the execution of the first program part comprises a backup storage of the currently relevant device state, and in which the continuation of the previously interrupted program part comprises the loading of the device state that was backup-stored during the interruption for the arithmetic logic unit taking over the continuation.

18. The method in accordance with claim 17, wherein the interruption of the execution of the first program part comprises the storage of the values of an arithmetic logic unit, registers, data memories, a program memory, a program pointer, files.

19. The method in accordance with claim 1, wherein a program part is designated as uninterruptible or as not simultaneously executable multiple times and is then also not interrupted or simultaneously executed multiple times when the other conditions occur.

20. The method in accordance with claim 19, wherein a program part is independently of priority assignments designated as uninterruptible or as not simultaneously executable multiple times and is then also not interrupted or simultaneously executed multiple times when the other conditions occur.

21. An apparatus in accordance with IEC 61499 for performing the method in accordance with claim 1 that includes a device controller or a plant controller or a programmable logic controller and that can have at least one sensor or data input and at least one actuator or data output.

22. A programming method wherein an IEC 61499-compliant programming interface is provided that is adapted for programming the method in accordance with claim 1.

23. The programming method in accordance with claim 22, wherein the programming interface comprises a graphical user interface that is adapted to input the programming of the priority-initiated interruption of the execution of the first program part on the first arithmetic logic unit.

24. A programming apparatus for performing the programming method in accordance with claim 22.

25. An execution apparatus for IEC 61499-compliant programs, comprising at least two arithmetic logic units for the parallel execution of program parts that are triggered by events marked with priorities, a programmable logic controller that controls the execution of program parts on the arithmetic logic units based on the priorities that are associated with the events triggering the program parts, wherein the programmable logic controller adapted to:

interrupt the execution of a first program part on an arithmetic logic unit and to initiate the execution of a second program part on this arithmetic logic unit if the event triggering the execution of the second program part has a higher priority than the event triggering the execution of the first program part; and store, in an electronic data storage, event lists, each event list corresponding to a different one of the first and second priorities, wherein each event list includes:

events that have occurred in accordance with the associated priority; and program parts still to be processed in accordance with the associated priority;

wherein the c programmable logic controller is configured to implement the events still to be processed of the event list of the second priority before the events still to be processed of the event list of the first priority.

* * * * *